United States Patent

[11] 3,594,077

[72] Inventors Raymond Marquis
 Plainville, Conn.;
 Edward K. Kaprelian, Mendham, N.J.
[21] Appl. No. 739,293
[22] Filed June 24, 1968
[45] Patented July 20, 1971
[73] Assignee The Kalart Company Inc.
 Plainville, Conn.

[54] MULTIPLE PROJECTOR SYSTEM WITH SINGLE SOUND SOURCE
 13 Claims, 9 Drawing Figs.
[52] U.S. Cl. .................................................. 353/94,
 352/12, 352/25, 352/31, 352/133, 353/15
[51] Int. Cl. ........................................................G03b 21/00
[50] Field of Search........................................... 352/89,
 131, 133, 17; 353/94, 15

[56] References Cited
UNITED STATES PATENTS

| | | | |
|---|---|---|---|
| 2,213,664 | 9/1940 | Berg........................... | 352/133 |
| 3,202,044 | 8/1965 | Harris......................... | 352/131 |
| 3,220,792 | 11/1965 | Vendig........................ | 352/89 |
| 3,309,163 | 3/1967 | White.......................... | 352/131 |
| 3,408,139 | 10/1968 | Schwartz et al.............. | 353/15 |
| 3,475,088 | 10/1969 | Saiia............................ | 352/133 |

Primary Examiner—Samuel S. Matthews
Assistant Examiner—M. L. Gellner
Attorney—Hane and Baxly ABSTRACT: A multiple projector system including a master projector such as a sound slide projector and one or several slave projectors such as slide projectors or motions picture projectors, and in which the master projector and the slave projectors share adjustably programmed projection time and playback time as controlled by a control system.

INVENTORS
RAYMOND MARQUIS
EDWARD K. KAPRELIAN
BY
Hane and Bayley
ATTORNEYS

INVENTORS
RAYMOND MARQUIS
EDWARD K. KAPRELIAN
BY
Hane and Bayley
ATTORNEYS

MULTIPLE PROJECTOR SYSTEM WITH SINGLE SOUND SOURCE

This invention relates to the projection of pictures with accompanying sound, and is directed particularly to an arrangement in which a master projector employing slides having a sound track shares projection time with one or more slave projectors.

Automatic slide projectors in which slides in a magazine are successively fed to a projection gate, either in timed sequence or upon demand from an operator are well known. Among such projectors is known a projector including a rotary circular magazine in which each slide is held in a narrow, radially oriented slot from which it is fed by gravity to a projection gate and is returned to its slot by a lifting arm at the end of the projection period. The magazine is then rotated to the next slot and the process is repeated. Projectors of this type are known by the trademark Carousel. A suitable projector of this general type is described in copending application Ser. No. 589,643 filed Oct. 26, 1966, now U.S. Pat. No. 3,408,139.

Arrangements are also well known in which a picture or a slide to be projected is provided with sound reproduction means in the form of fixed or movable sound tracks, or in the form of a strip of magnetic tape. One such cartridge is disclosed in copending application Ser. No. 135,923 filed Sept. 5, 1961, now U.S. Pat. No. 3,517,991, in which one portion of the cartridge receives the slide to be projected and a second portion includes a cavity in which a length of magnetic sound recording tape is retained in a manner which permits it to cooperate with a capstan and pickup head in the projector and thereby to reproduce a sound message lasting for approximately 30 seconds or longer. A projector in which the necessary elements have been arranged to perform the various functions is described in copending application Ser. No. 589,643 filed Oct. 26, 1966, now U.S. Pat. No. 3,408,139. In this particular system, a self-contained adapter fits over the Carousel projector or similar projector and functions to project successively slides placed in the projection position and to reproduce the accompanying sound, utilizing the projection lens, lamp and condenser system as well as the lamp switch and other elements of the Carousel projector.

Although this arrangement is satisfactory for most purposes there are certain applications, such as in teaching and in some types of briefing, where it is desirable to present to the audience more than one pictorial message during the period of the auditory message. For example, it may be of value to show a second or third slide depicting a situation related to that in the first slide, or one which follows chronologically, or a short sequence of motion pictures which portrays some dynamic aspect or detail of the narrative material.

Accordingly, it is an object of this invention to provide a control system for sharing projection time between a master slide-and-sound projector and one or more slave projectors.

It is also an object of the invention to provide a control system for sharing at least part of an audible message played back from a record carrier contained within cartridges in the master projector with one or several silent still picture or motion picture slave projectors.

Another object of the invention is to provide a control system which can vary the amount of time shared among the projectors.

Still another object of the invention is to utilize either still or motion picture projectors as desired.

Still another object of the invention is to utilize as slave projectors existing available devices with a minimum of modification.

These and other objects of the invention will become apparent from the specification and drawings in which.

Figure 1:
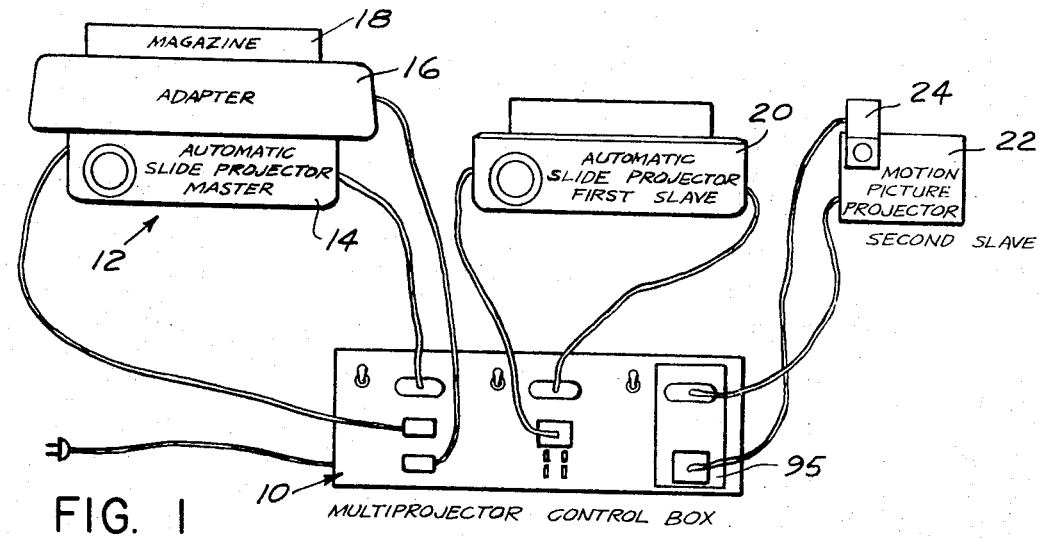
FIG. 1 shows diagrammatically a complete typical multiple projector control system.

In FIG. 1 there is shown an arrangement in which a multiprojector control box 10 is connected to a master soundslide projector shown generally at 12, and comprising an automatic slide projector 14 of, for instance, the Carousel type, an adapter 16 for converting the projector to accept sound and slide cartridges, and a magazine 18 containing a number of cartridges, each containing a slide and a sound record carrier having recorded thereon a message. Each slide and the associated sound record carrier constitute a presentation unit. The control box is also connected through suitable cables, to be described, to a first conventional automatic slide projector 20 without sound equipment which may also be of the Carousel type, a second projector 22 which may be either another conventional automatic slide projector or a motion picture projector and a photorelay box 24 which coacts with the projection lens of the motion picture projector, projectors 20 and 22 constituting the slave projectors. Although any motion picture projector is suitable for use with the system, a magazine type of 8 mm. projector is preferred.

Figure 2:
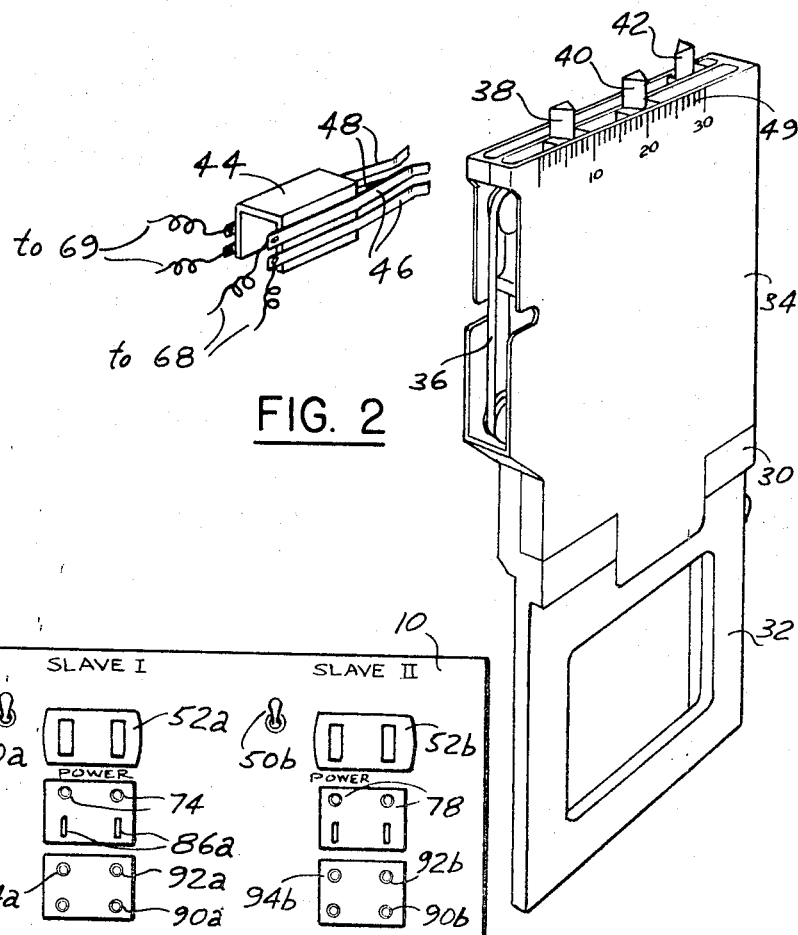
FIG. 2 shows the cartridge which contains the slide and the sound tape.
Figure 5:
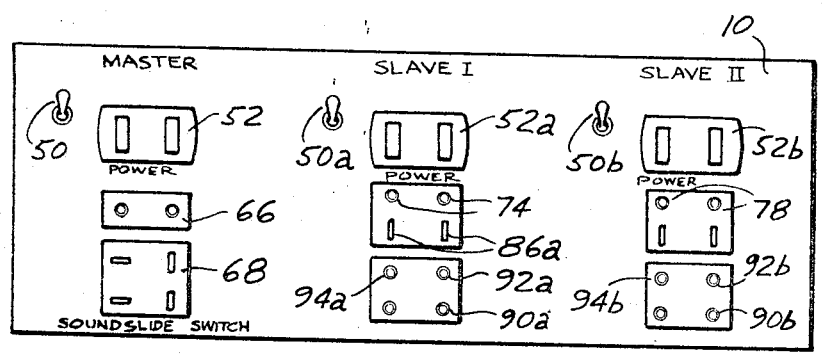
FIG. 5 is an external view of the multiprojector control box.

A cartridge as may be used in the master projector 12 is shown in FIG. 2. It comprises a body 30 having a portion 32 which accepts a conventional slide, such as a 35 mm., color slide in a cardboard mount. An upper portion 34 of the body includes a cavity in which is retained on suitable reels a length of magnetic recording tape 36. Atop the edge of the cartridge there are a number of adjustable electrically conducting wedge-shaped tabs 38, 40 and 42. These tabs may be s set in selected positions relative to the respective vertical edge of the cartridge. Although the specific construction of the cartridge is not significant to the present invention, the characteristics and details of one suitable type of cartridges have been set forth in the aforesaid pending application Ser. No. 135,923.

Figure 3:
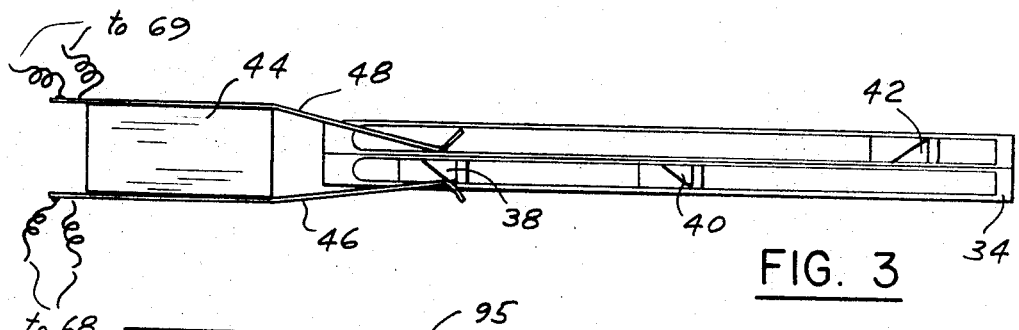
FIG. 3 shows a top view of the cartridge of FIG. 2 coacting with the mechanism in the projector to initiate the control functions.

As shown in FIGS. 2 and 3, the tabs coact with a slidably moving time sensing bar 44 which is built into and is part of adapter 16. Bar 44 carries pairs of switch contact arms 46 and 48 of a springy metal such as phosphor bronze. When the cartridge is in the playback position, the slide associated with it is in the projection gate, the magnetic tape is being driven past a pickup head, not shown, by a capstan, not shown, and bar 44 is slowly moved by a motor, not shown, toward the cartridge so that the pairs of contact arms are bridged by tabs 38, 40 or 42 in a manner to be described.

As bar 44 moves toward the cartridge, contact arms 46 are first bridged by tab 38, then opened after passing the tab and later closed again by tab 40. Due to the aforedescribed positioning of the tabs, contact arms 48 are not touched by tabs 38 and 40 and are not bridged until they reach tab 42. As can be seen from FIGS. 2 and 3, the wedges of tabs 38 and 40 expand to the right while the wedge of tab 42 expands to the left. Depending upon the desired programming, the tabs may be shifted on the cartridge edge as required. The tabs are electrically independent of each other and of the slide cartridge. A scale such as that shown at 49 may be provided at the top edge of the cartridge to indicate the number of seconds for which each tab is to be set to perform a particular programming function.

Stated briefly, the function of multiprojector control box 10 is to start master projector 12, receive signals from the switches 46 and 48 carried on the time sensing bar 44 as they are activated by the tabs, and successively turn off the slide advance in the master projector while permitting the sound pickup head to operate, turn on the first slave projector 20, turn off the first slave projector, simultaneously turn on the second slave projector 22, turn off the second slave projector and recycle the master projector 12 to take its next slide while advancing each slave projector to its next slide or portion of motion picture film, as appropriate.

Figure 4:
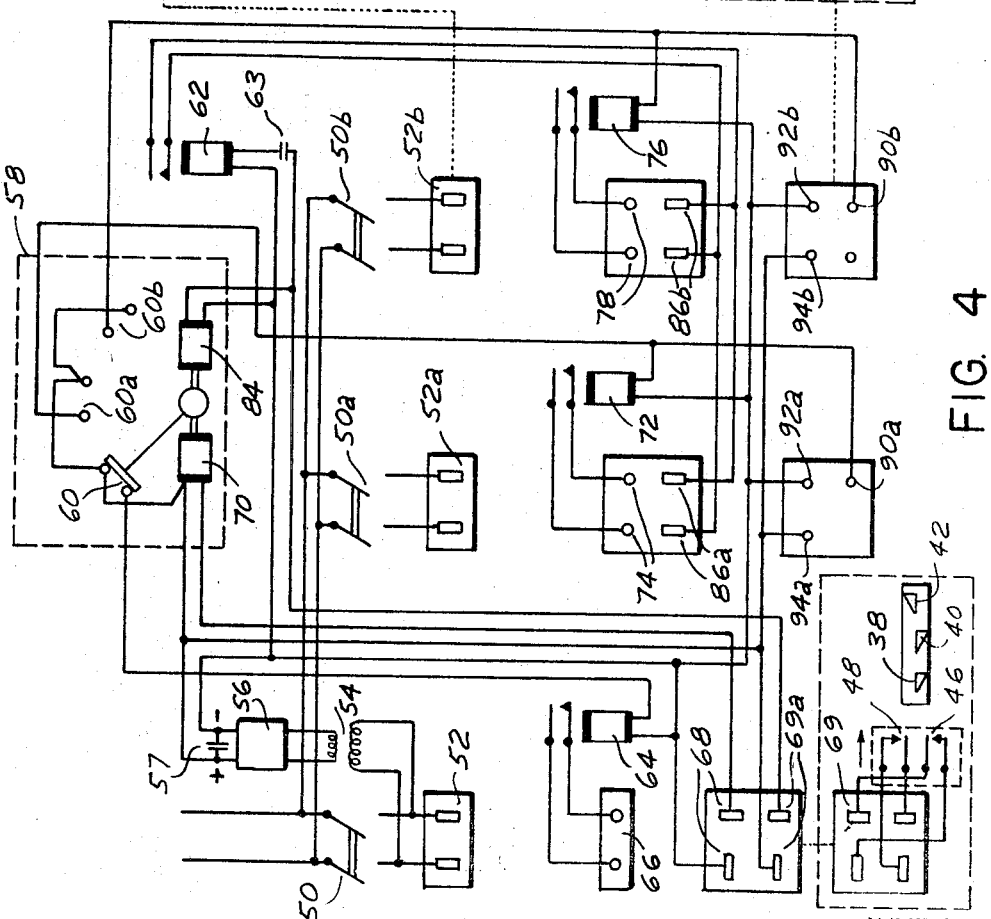
FIG. 4 shows schematically the circuit system of the multiprojector control box.

The manner in which this is accomplished can be seen in FIG. 4. Power from a source such as a wall plug is fed to switches 50, 50a and 50b and to sockets 52, 52a and 52b into which are plugged the power cords of master projector 12 and slave projectors 20 and 22 respectively, both slave projectors being presumed to be still picture projectors. Switch 50 and also provides power to a voltage reducing transformer 54, a rectifier bridge 56 and a capacitor 57 for providing direct current power to the pairs of switch contact arms 46 and 48 in a manner to be described, and to a stepping switch shown generally at 58 and having a stepping coil 70.

Stepping switch 58 is of the reset type and has three steps indicated by pairs of nonbridging contacts. When in its initial or reset position, a contact arm 60 of stepping switch 58 closes a circuit for a relay 64. The relay closes its contacts thereby connecting through a plug 66 the lamp, not shown, of the master projector 12, the master projector already receiving power from socket 52 for its blower and its advance mechanism. The slide in the gate of the master projector is now projected on the screen and the accompanying sound on the tape in the cartridge is reproduced through a speaker, not shown.

When contact arms 46 on bar 44 (FIG. 3) reach tab 38, the circuit to a plug 68 to which the tab is connected is closed, thereby energizing the stepping coil 70 of switch 58 to move the contact arm 60 to contact position 60a. This action opens the circuit of relay 64, deenergizing the lamp in the master projector while permitting continued sound reproduction from the tape in the cartridge. The contact position 60a energizes a relay 72 which in turn closes its contacts and through a socket 74 and a connecting cord (not shown) energizes the lamp (not shown) in the first slave projector 20 which projects its first slide. Power for the blower and the advance mechanism of the projector is provided through is power cord connected to socket 52a.

When the set time period for the first slave projector 20 has ended contact arms 46 are bridged by tab 40. This causes stepping coil 70 to move contact arm 60 into a contact position 60b. Contact position 60a is opened and contact position 60b closes a circuit for a relay 76 which in turn closes its contacts and through a socket 78 and a connecting cord (not shown) energizes the lamp (not shown) in the second slave projector. At the end of the time period set for this projector, contact arms 48 are closed by tab 42 which through connectors 69 and 69a pulses a relay 62 thereby changing the slides in both slave projectors through plugs 86a and 86b and disconnecting the lamp in the second projector. Capacitor 63 insures that relay 62 does not remain closed. Contact arms 48 simultaneously energize a reset coil 84 which restores the stepping switch to its contact position 60.

If no second slave projector is used, tab 40 is pushed back beyond tab 42. When the time allotted to the first slave projector has ended, contact arms 48 are closed by tab 42; tab 40 is not used under these circumstances.

If the second slave projector 22 is a motion picture projector, the cycling is somewhat different and accomplished through a photoelectric adapter box 95 to be described.

Figure 7:
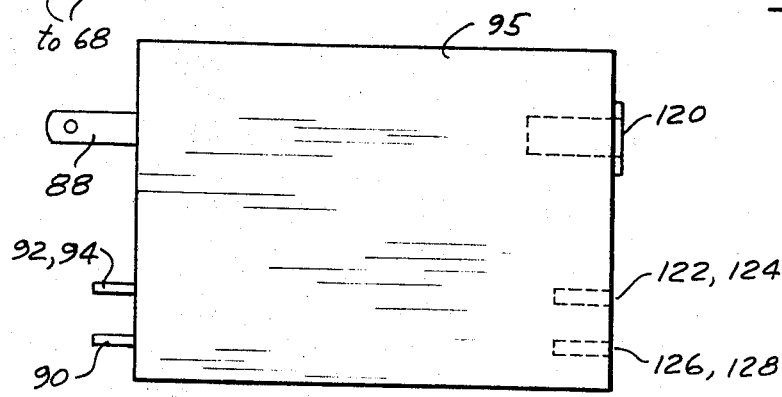
FIG. 7 is an external view of the adapter box.
Figure 6:
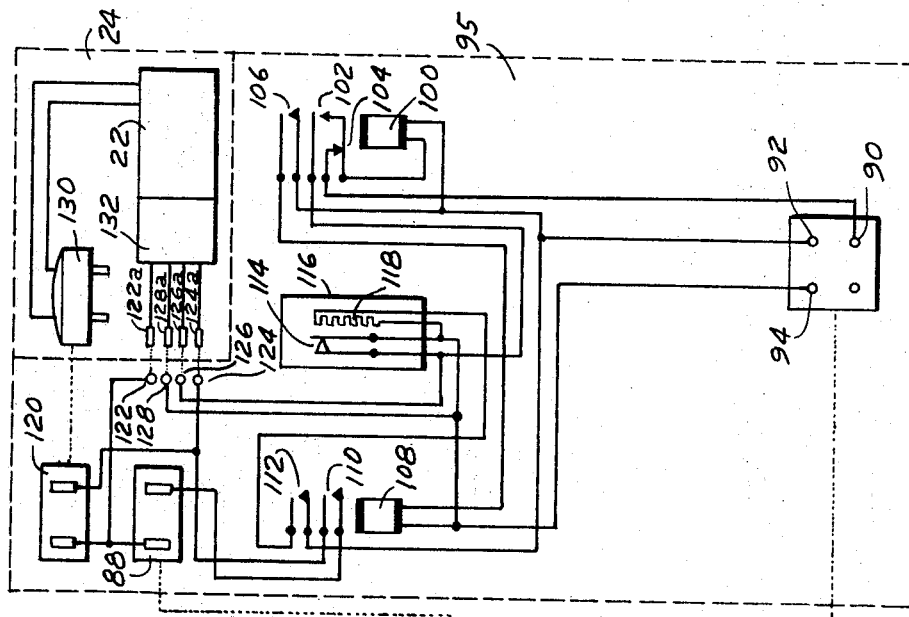
FIG. 6 is a schematic diagram showing the circuitry in a photoelectric adapter box used with the control box for motion picture projector adaption.

With a motion picture projector as second slave projector, it is necessary to match its functions to that of the automatic still picture projector 20 which is provided with a separate switch for its lamp and is capable of being cycled to the next slide through a circuit separate from its power circuit. To achieve such match, a photoelectric adapter box 95 as shown in FIGS. 6 and 7 is used as an intermediary between the control box 10 and the motion picture projector 22. It is plugged into either one of the two slave station locations so that connector contacts 88 of the adapter box contact with either socket 52a or 52b while contact pins 90, 92 and 94 of the adapter box enter either contacts 90a, 92a and 94a or 90b, 92b and 94b respectively of the control box, as is indicated by the dotted lines connecting FIGS. 4 and 6, the adapter box being shown to be plugged into the socket 52b and contacts 90b, 92b and 94b belonging to slave projector 22 assumed to be a motion picture projector.

Turning now to FIG. 6, the left-hand edge of which should be placed in registry with the right-hand edge of FIG. 4, contacts 88 provide the mains power for projector 22 while contacts 92 and 94 connect to the low voltage DC from rectifier bridge 56. Contact pin 90 receives the operating signal via contact position 60b (or contact position 60a, depending upon the slave station location into which the adapter is plugged). When the signal to start is received via contact pin 90, a relay 100 is energized. Relay contact 102 closes before relay contact 104 opens. Relay contact 106 also closes and, in turn, energizes a relay 108 causing the same to close its contacts 110 and 112.

The closing of contact 102 of relay 100 provides DC voltage at normally closed contacts 114 of a delay switch 116 shown here as a thermal delay switch, although other types are equally suitable. Simultaneously, contact 112 of relay 108 energizes a heater element 118 in the delay switch.

Contact 110 of relay 108 supplies mains power from connector 88 to a socket 120 at the front of the adapter box (FIG. 7). Pins 122 and 124 of a four-pin socket also are now provided with mains power. The remaining pins 126 and 128 of the socket are connected across contacts 114 in delay switch 116. A projector plug 130 is connected to socket 120 and a four-pin plug attached to a photorelay 132 is connected to the four-pin socket. Pins 122a and 124a of this plug provide mains power to the photorelay which remains closed only while illuminated. Thus, as long as either contact 114 of relay switch 116 is closed or photorelay 132 receives light, relay 100 remains energized.

Figure 8:
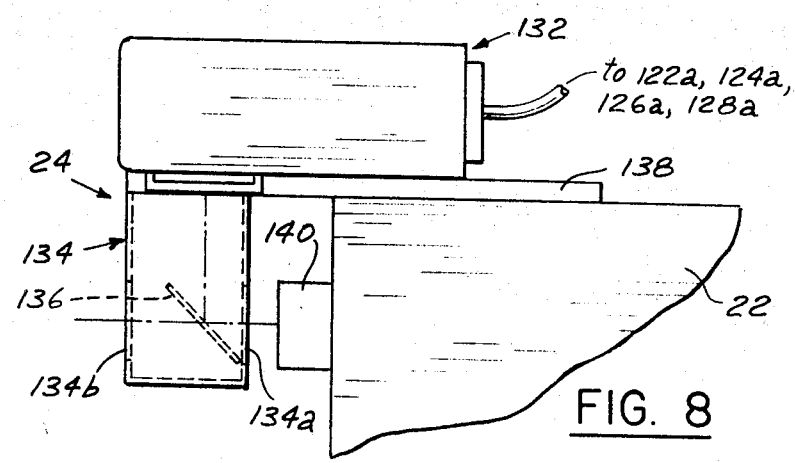
FIG. 8 shows a light relay used with the motion picture projector.

Referring now to FIG. 8, it can be seen that photorelay 132 comprises a box 24, portion 134 of which has openings 134a and 134b, and contains a beamsplitter 136 set at 45° to the optical axis of the lens. Box 24 is supported by a bracket 138 which carries the photorelay in light-receiving relation to the beamsplitter and to a projector lens 140.

Figure 9:
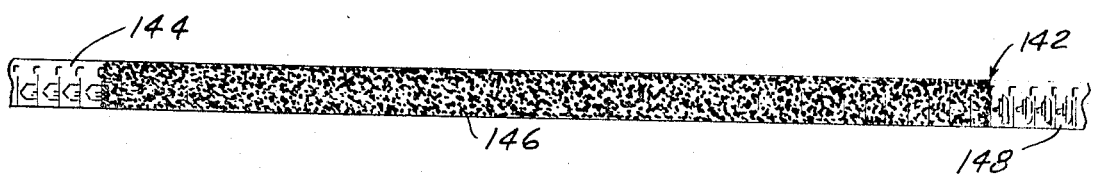
FIG. 9 shows a section of the motion picture film which coacts with the light relay.

FIG. 9 shows a film 142 as used in motion picture projector 22. It comprises a plurality of frames depicting motion picture sequences or messages 144 and 148, the sequences being each separated by an opaque film section 146 which may be 10 to 30 frames in length, or as desired to fulfill the necessary function to be described.

In operation, the signal received through contact pin 90 starts the motion picture projector which as previously described, constitutes the second slave projector. The circuit through contact pin 90 is closed through contacts 114 which are closed inasmuch as the projector starts with an opaque film section 146 of film 142 in the gate and no light reaches photorelay 132 initially. After approximately one-half to 1 second, the opaque section of the film clears the gate and the first picture message starts. Sufficient light reaches photorelay 132 via beamsplitter 136 at this time to close the circuit to socket pins 126 and 128. Within three to five seconds, delay switch 116 opens due to the heating of heating element 116 via relay contacts 112, but relays 100 and 108 are kept energized through photorelay 132. At the end of the first message, a new opaque section enters the gate, photorelay 132 opens, relays 100 and 108 not open and all power is interrupted including that to projector 22 via contacts 110, socket 120 and plug 130. Projector 22 coasts to a stop within a few frames, leaving some portion of the opaque section of film 142 still in the projector gate. Substantially simultaneously with this action, tab 42 closes the circuit to reset coil 84 for stepping relay 58 as described above and a new cycle starts. Upon receiving its next signal from the control box, the cycle is repeated and projector 22 projects the next message sequence on the motion picture film.

It should be noted that this arrangement requires only that the motion picture message time be not longer than the cycle time set by the tabs. With this condition established the projector will complete its message regardless of the fact that contact arms 46 are not continuously closed by tab 38 or tab 40, since closing of relay 100 makes the adapter box 16 independent of the signal from contact 90; it receives continuous power from contacts 94 and 92 and can thereby complete its cycle. Furthermore, the opaque section acts to resynchronize each new message portion, in turn, thereby avoiding cumulative errors in timing.

Although not shown in the drawings, the system can be modified so that reset coil 84 can be actuated by adapter 95 when the last portion of a given message is in the form of a motion picture sequence. In such a case, tab 42 would not be used.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

We claim:
1. A multiple projector system comprising in combination:
a sound-slide master projector including optical means for projecting slides, one by one, sound means for reproducing sound recorded on record carriers, each of said record carriers being associated with a respective one of said slides to constitute a presentation unit, and advance mechanism for successively moving presentation units into position for simultaneous projection and reproduction respectively;
a slave projector including optical means for projecting pictorial messages, one by one, and advance mechanism for successively moving said pictorial messages into position for projection; and
control means controlling said master projector and slave projector, said control means sequentially operating the master projector simultaneously to project and reproduce from the respective presentation unit, then operating the master projector after a first predetermined period of time to discontinue projection but to continue sound reproduction by the master projector and substantially simultaneously operating the slave projector to project a pictorial message during the continued reproduction of sound by the master projector, then after a second predetermined time period of sound reproduction operating the advance mechanism of the master projector to move a second presentation unit into position for projection and sound reproduction respectively, and also the advance mechanism of the slave projector to move a second pictorial message into position for projection,
said control means including a first switch means having a first and second switching position, second switch means controlling the first switch means, said first switch means in the first switching position, upon connection of the master projector to a source of current, closing energizing circuits for the optical means and the sound reproducing means of the master projector, said master projector after a first predetermined time interval, operating the second switch means to close the energizing circuits for moving the first switch means from the first switching position into the second switching position, the first switch means in said second switching position disconnecting the optical means of the master projector but leaving connected its sound reproducing means and also connecting the optical means of the slave projector to effect projection by said master projector, said second switch means after a second predetermined time interval being operated by the master projector for closing the energizing circuits to disconnect the sound reproducing means of the master projector and the optical means of the slave projector and also activate the advance mechanisms of the master projector and the slave projector for advancing respectively another presentation unit in the master projector and another pictorial message in the slave projector into positions for projection and sound reproduction respectively.

2. The multiple projector system according to claim 1 and comprising a second slave projector including optical means for projecting pictorial messages, one by one, said control means activating said second slave projector to project a first pictorial message for a predetermined period of time during reproduction of sound by the master projector and then activating the advance mechanism of the second slave projector to move a second pictorial message into position for projection.

3. The multiple projector system according to claim 2 wherein said control means control said slave projectors so that the first slave projector is deactivated for projecting a pictorial message prior to the activation of the second slave projector for projecting a pictorial message.

4. The multiple projector system according to claim 1 wherein said first switch means comprises a stepping switch means having a first stepping position and a second stepping position, said second switch means moving said stepping switch means from the first stepping position into the second stepping position at the end of said first predetermined time interval, and reset means for restoring the stepping switch means to its first switching position, said second switch means at the end of said second predetermined time interval energizing said reset means for restoring the stepping switch means to the first switching position.

5. A multiple projector system according to claim 1 wherein said second switch means comprises a first and a second stationary switch contact connected to said energizing circuits and a movable switch contact successively and alternately engageable with said stationary switch contacts, said movable switch contact being moved by the master projector at a predetermined rate of speed toward said stationary switch contacts for successive and alternating engagement therewith, engagement of the movable switch contact with the first stationary switch contact connecting the energizing circuits for discontinuing projection but continuing sound reproduction by the master projector and also for activating the slave projector for projection, and engagement of the movable switch contact with the second stationary switch contact connecting the energizing circuits for discontinuing sound reproduction by the master projector and projection by the slave projector, activating the advance mechanism of the master projector for advancing another presentation unit into position for projection and sound reproduction respectively, and activating the advance mechanism of the slave projector for advancing another pictorial message into position for projection.

6. The multiple projector system according to claim 5 and comprising a plurality of cartridges, each housing the slide and the associated sound record carrier of a presentation unit, said cartridges being movable in the master projector one by one, into projection and sound reproduction position by the advance mechanism of the mater projector upon activation of said mechanism, each of said cartridges adjustably supporting said stationary switch contacts, the positions of said switch contacts in reference to each other controlling said predetermined time intervals.

7. The multiple projector system according to claim 1 and further comprising a second slave projector including optical means for projecting pictorial messages, one by one, and advance mechanism for successively advancing said pictorial messages into projection, said control means comprising a first switch means having a first, a second and a third switching position, second switch means controlling the first switch means, said first switch means in the first switching position, upon connection of the master projector to a source of current, closing energizing circuits for the optical means and the sound reproducing means of the master projector, said master projector after a first predetermined time interval, operating the second switch means for closing the energizing circuits for moving the first switch means from the first switching position into the second switching position, the first switch means in said second switching position disconnecting the optical means of the mater projector but leaving connected its sound reproducing means and also connecting the optical means of the first slave projector to effect projection by said projector, said second switch means after a second predetermined time interval being operated by the master projector for moving the first switch means from the second switching position into the third switching position, movement of the first switch means into said third switching position closing the energizing circuits for disconnecting the optical means of the first slave projector and connecting the optical means of the second slave projector, and after a third predetermined period of time being operated by the master projector for closing the energizing circuits to disconnect the sound reproducing means of the master projector and the optical means of the second slave projector, to activate the advance mechanism of the master projector for advancing another presentation unit into position for projection and sound reproduction respectively, to activate the advance mechanism of the first slave projector for advancing another pictorial message into position for projection and to activate the advance mechanism of the second slave projector for advancing another pictorial message into position for projection.

8. The multiple projector system according to claim 1 and comprising a motion picture type second slave projector, said control means being programmed to limit maximum projection time by said motion picture projector to the period of time during which the master projector is reproducing sound.

9. The multiple projector system according to claim 8 wherein said control means are programmed for intermittently projecting pictorial messages during said period of time during which sound is reproduced by the master projector.

10. A multiple projector system comprising in combination:
   a sound slide master projector for playing back for a predetermined total period of time and projecting respectively a succession of presentation units each composed of a slide and a sound record carrier;
   a first slave projector for projecting a succession of slides;
   automatic cycling means controlling the master projector and the slave projector, said cycling means being programmed:
      a. first to activate the master projector for playing back and projecting a presentation unit;
      b. then to discontinue projection by the master projector after a predetermined fraction of said total period of time while continuing playback and to activate substantially simultaneously the first slave projector for projection;
      c. then to discontinue playback by the master projector and projection by the first slave projector at the end of said predetermined total period of time;
      d. then to advance the master projector for projection and playback of another presentation unit and the slave projector for projection of another slide;
   a second slave projector including an optical means and mechanism for projecting motion picture film;
   a motion picture film having lengthwise alternating picture frame sections and opaque sections, said film being adapted to be transported and projected by said second slave projector;
   starting switch means included in a circuit connected to said second slave projector, closing of said switch means energizing said circuit for starting running of the second slave projector;
   light-sensitive switch means;
   time-delay switch means connected to said circuit, said delay switch means being connected in a control circuit with said light-sensitive switch means such that the delay time of the delay switch means is started by the light-sensitive switch means when the latter receives light from the second slave projector, said delay switch means at the end of the delay time opening said circuit; and
   bypass circuit means controlled by the light-sensitive switch means to bypass the opening of the circuit by the delay switch means when and while the light-sensitive switch means receive light,
   whereby upon initially placing an opaque film section in position for projection by the master projector and operating said starting switch means the second slave projector starts transport of the film, but the light-sensitive switch means remain inactive until the next succeeding picture frame section reaches the projection position whereupon projection starts, activation of the light-sensitive switch means by the light now received from the projector starting the delay by the delay switch means, said delay switch means becoming effective to open the energizing circuit in the second slave projector to stop running of the same when the next opaque film section reaches the projection position.

11. The cycling system according to claim 10 wherein said light-sensitive switch means comprises a photoelectric relay, the state of energization of said relay controlling said bypass circuit means, and a light-deviating means deflecting light from the second slave projector to said photoelectric relay for energizing the same, energization of the relay activating the delay switch means.

12. The cycling system according to claim 11 wherein said light-deviating means is a beamsplitter placed in the light beam projection path of the second projector to deflect part of the light of said beam to the photoelectric relay.

13. The cycling system according to claim 10 wherein said time-delay switch means comprises a temperature-sensitive switch means having normally closed switch contacts included in the energizing circuit of the projector, said temperature-sensitive switch means including heating means connected in circuit with the light-sensitive switch means, said heating means being activated by the light-sensitive switch means when light from the projector impinges upon the same, activation of the heating means causing opening of the switch contacts thereby opening said energizing circuit.